(12) United States Patent
Jeong et al.

(10) Patent No.: US 11,945,002 B2
(45) Date of Patent: Apr. 2, 2024

(54) AUTOMATIC METAL SORTING SYSTEM AND METHOD USING LASER INDUCED BREAKDOWN SPECTROSCOPY

(71) Applicant: GIST(Gwangju Institute of Science and Technology), Gwangju (KR)

(72) Inventors: Sung Ho Jeong, Gwangju (KR); Sung Ho Shin, Gwangju (KR); Young Min Moon, Gwangju (KR); Jae Pil Lee, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 99 days.

(21) Appl. No.: 17/711,540

(22) Filed: Apr. 1, 2022

(65) Prior Publication Data
US 2022/0219205 A1    Jul. 14, 2022

Related U.S. Application Data

(63) Continuation of application No. PCT/KR2020/008124, filed on Jun. 24, 2020.

(30) Foreign Application Priority Data

Oct. 2, 2019  (KR) .......................... 10-2019-0122274

(51) Int. Cl.
*B07C 5/34* (2006.01)
*B07C 5/342* (2006.01)
*B07C 5/36* (2006.01)

(52) U.S. Cl.
CPC .............. *B07C 5/342* (2013.01); *B07C 5/365* (2013.01); *B07C 2501/0054* (2013.01)

(58) Field of Classification Search
CPC ......... B07C 5/02; B07C 5/342; B07C 5/3427; B07C 5/38; B07C 2501/0054;
(Continued)

(56) References Cited

U.S. PATENT DOCUMENTS

2003/0034281 A1    2/2003  Kumar
2020/0264418 A1*   8/2020  Dobek ................. G02B 21/361
(Continued)

FOREIGN PATENT DOCUMENTS

KR   10-2012-0063166 A    6/2012
KR   10-2015-0123513 A    11/2015
(Continued)

OTHER PUBLICATIONS

English Translation of KR 101939283 B1; Inventor: Lee; Pub. Date: Jan. 2019 (Year: 2019).*
(Continued)

*Primary Examiner* — Joseph C Rodriguez
(74) *Attorney, Agent, or Firm* — Studebaker & Brackett PC

(57) ABSTRACT

The present disclosure relates to an automatic metal sorting system using laser induced breakdown spectroscopy. The system may include: a conveyer configured to move waste metals at a constant speed; a shape measurer configured to measure a position and a shape of at least one waste metal on the conveyer; a laser induced breakdown spectroscopic device configured to determine the kind of the waste metal by emitting a laser to the waste metal and receiving and analyzing a plasma spectrum signal generated by the emitted laser; and a discharger configured to separate and discharge the waste metal in accordance with the determined kind of the waste metal.

16 Claims, 7 Drawing Sheets

(58) Field of Classification Search
CPC .. G01N 21/71; G01N 21/718; G01N 2021/84; G01N 2021/845; G01N 2201/0484
See application file for complete search history.

(56) References Cited

U.S. PATENT DOCUMENTS

| | | | |
|---|---|---|---|
| 2020/0376488 A1* | 12/2020 | Wu | B01L 3/0241 |
| 2022/0082435 A1* | 3/2022 | Sobron | G01J 3/021 |
| 2023/0032192 A1* | 2/2023 | Ohba | G01N 21/17 |

FOREIGN PATENT DOCUMENTS

| | | |
|---|---|---|
| KR | 10-1939283 B1 | 1/2019 |
| KR | 10-2019-0096666 A | 8/2019 |

OTHER PUBLICATIONS

International Search Report issued in PCT/KR2020/008124; dated Feb. 16, 2021.

\* cited by examiner

AUTOMATIC METAL SORTING SYSTEM AND METHOD USING LASER INDUCED BREAKDOWN SPECTROSCOPY

CROSS-REFERENCE TO RELATED APPLICATIONS

This application is a Continuation of International Application No. PCT/KR2020/008124 filed on Jun. 24, 2020, which claims priority to and the benefit of Korean Patent Application No. 10-2019-0122274 filed in the Korean Intellectual Property Office on Oct. 2, 2019, the entire contents of which are incorporated herein by reference.

BACKGROUND OF THE INVENTION

Field of the Invention

The present disclosure relates to an automatic metal sorting system and method using laser induced breakdown spectroscopy and, more particularly, to an automatic metal sorting system and method that sorts waste metals by measuring the position and shape of waste metals and analyzing plasma that is produced when a laser is emitted.

Description of the Related Art

Waste metal resources of about a level of 4 trillion Won are made in every year in Korea and waste metals are metal resources having high economic value because it can be immediately used through only a minimal refinement process. Recycling of waste metals is promoted all over the world as a national emphasis business in terms of resource saving, but it has been known that the domestic technology of recycling waste metals and relevant industries are very poor despite the high economic value.

The core reason of low recycling rate of waste metal resources is because the collection route of waste metal scraps and the kinds are various, so it is impossible to sort the scraps on the basis of a unified standard and there is no technology that can accurately analyze the kinds and components of waste metals of which the collection routes are unclear.

It is required to develop an automated system that can sort various kinds of mixed metal scraps at a high speed in order to increase the recycling rate of waste metal resources. Existing technologies has a problem that the sorting accuracy is low because the technologies depend on the colors of metals or whether metals have magnetism.

Further, referring to FIGS. 3 and 4, when a plasma spectrum signal that a laser induced breakdown spectroscopic device collects is not corrected, a maximum of 100 mm measurement distance difference may be generated between a reference focus and plasma produced when the positions of waste metals that are input, as shown in FIG. 3. As a result, as shown in FIG. 4, when the positions of waste metals increase in the width direction from a reference point, there is a problem that the laser induced breakdown spectrum signals that are measured gradually decrease in size and a situation in which a signal is not measured even though plasma is actually produced from a laser occurs.

SUMMARY OF THE INVENTION

The present disclosure has been made in an effort to solve the problems and an objective of the present disclosure is to provide an automatic metal sorting system and method using laser induced breakdown spectroscopy.

The objectives of the present disclosure are not limited to those described above and other objectives may be made apparent to those skilled in the art from claims.

In order to achieve the objectives, an automatic metal sorting system using laser induced breakdown spectroscopy according to an embodiment of the present disclosure is disclosed. The system may include: a conveyer configured to move waste metals at a constant speed; a shape measurer configured to measure a position and a shape of at least one waste metal on the conveyer; a laser induced breakdown spectroscopic device configured to determine the kind of the waste metal by emitting a laser to the waste metal and receiving and analyzing a plasma spectrum signal generated by the emitted laser; and a discharger configured to separate and discharge the waste metal in accordance with the determined kind of the waste metal.

Further, according to an embodiment of the preset disclosure, the laser induced breakdown spectroscopic device may include: a laser emitter; a galvano-scanner configured to emit a laser to waste metals randomly spread on the conveyer by changing a direction of the laser emitted from the laser emitter by adjusting the angle of a mirror disposed in the galvano-scanner; and a plasma signal configured to focus plasma signals generated by the emitted laser on an optical fiber connected with a spectroscope.

Further, according to an embodiment of the present disclosure, the laser induced breakdown spectroscopic device may further include a focusing module configured to adjust a focal length of the laser emitted from the laser emitter in accordance with a change in position and shape of the waste metals.

Further, according to an embodiment of the present disclosure, the laser induced breakdown spectroscopic device may further include a collection module configured to collect plasma spectrum signals generated by emitting a laser to waste metals through the galvano-scanner.

Further, according to an embodiment of the present disclosure, the focusing module may include: two optical lenses; and a first variable lens inserted in the fronts of the two optical lenses.

Further, according to an embodiment of the present disclosure, the collection module may include: two optical lenses; and a second variable lens inserted between the two optical lenses.

Further, according to an embodiment of the present disclosure, the collection module may be a module that includes: two optical lenses; and a second variable lens inserted between the two optical lenses, and that adjusts a beam, which has passed through the second variable lens to become parallel light, by changing a curvature of the second variable lens, and collects adjusted plasma spectrum signals.

Further, according to an embodiment of the present disclosure, the first variable lens may be a liquid-state lens of which a curvature is changed when a current is applied to the first variable lens.

Further, according to an embodiment of the present disclosure, the second variable lens may be a liquid-state lens of which a curvature is changed when a current is applied to the second variable lens.

Further, according to an embodiment of the present disclosure, the discharger may be positioned at an end of the conveyer and may separate and discharge the waste metals in accordance with the determined kinds of the waste metals using air nozzles.

In addition, an automatic metal sorting method using laser induced breakdown spectroscopy according to an embodiment of the present disclosure is disclosed. The method may include: a shape measurement step of measuring a position and a shape of at least one of waste metals being on a conveyer that is being moved at a constant speed; a laser induced breakdown spectroscopic determination step of determining the kind of the measured waste metal by emitting a laser to the waste metal and by analyzing a plasma spectrum signal generated by the emitted laser; and a step of separating and discharging the waste metal in accordance with the kind of the waste metal determined in the laser induced breakdown spectroscopic determination step.

Further, according to an embodiment of the present disclosure, the laser induced breakdown spectroscopic determination step may include: a laser emission step of emitting a laser; a focusing step of adjusting a focal length of the laser emitted in the laser emission step in accordance with changes in position and shape of waste metals; a galvano-scanner step of emitting a laser to waste metals randomly spread on the conveyer by changing a direction of the laser having the adjusted focal length by adjusting a mirror disposed in a galvano-scanner; a collection step of collecting plasma spectrum signals generated by emitting a laser to the waste metals through the galvano-scanner step; and a spectrum signal obtainment step of focusing the collected plasma spectrum signals on an optical fiber connected with a spectroscope.

Further, according to an embodiment of the present disclosure, the focusing step may be a step of adjusting a focal length of a laser using two optical lenses and a first variable lens inserted in the fronts of the two optical lenses.

Further, according to an embodiment of the present disclosure, the collection step may be a step of adjusting a beam, which has passed through a second variable lens, to become parallel light by changing a curvature of the second variable lens and of collecting adjusted plasma signals by using two optical lenses and the second variable lens inserted between the two optical lenses.

Further, according to an embodiment of the present disclosure, the first variable lens may be a liquid-state lens of which a curvature is changed when a current is applied to the first variable lens.

Further, according to an embodiment of the present disclosure, the second variable lens may be a liquid-state lens of which a curvature is changed when a current is applied to the second variable lens.

Further, according to an embodiment of the present disclosure, the separating and discharge step may be a step that is positioned at an end of the conveyer and separates and discharges the waste metals in accordance with the determined kinds of the waste metals using air nozzles.

Details for achieving the objectives would be made clear by referring to the following embodiments to be described with the accompanying drawings.

However, the present disclosure is not limited to the embodiments disclosed hereafter and may be configured in various other ways, which is provided to complete the present disclosure and completely inform those having common knowledge in the art (hereafter, "those skilled in the art") of the range of the present disclosure.

According to an embodiment of the present disclosure, it is possible to quickly perform analysis in comparison to the related art by analyzing waste metals that are moving, so it is economically excellent.

According to an embodiment of the present disclosure, it is possible to analyze waste metals in real time by adjusting a variable lens, so it is excellent in terms of the efficiency of sorting waste metals, whereby it is possible to increase the recycling rate of waste metals.

According to an embodiment of the present disclosure, the present disclosure performs analysis using laser spectroscopic analysis, thereby being able to considerably increase the economic value of waste metals by sorting non-ferrous metals having similar colors, which were impossible to sort in the related art, by accurately measuring the chemical compositions of the non-ferrous metals.

According to an embodiment of the present disclosure, a focal length and errors of spectrum signals are corrected using a variable lens, so it is possible to reduce determination errors due to a distance difference.

The effects of the present disclosure are not limited to the effects described above, and provisional effects that are expected from the technical features of the present disclosure would be clearly understood from the following description.

BRIEF DESCRIPTION OF THE DRAWINGS

Some of embodiments are shown in the accompanying drawings so that the characteristics of the present disclosure stated above can be understood with reference to the following detailed and more specified embodiments. Further, similar reference numerals in the drawings are given to indicate the same or similar functions in several respects. However, it should be noted that the accompanying drawings show only specific typical embodiments of the present disclosure without limiting the scope of the present disclosure and other embodiments having the same effects may be sufficiently recognized.

DETAILED DESCRIPTION OF THE INVENTION

Figure 1:
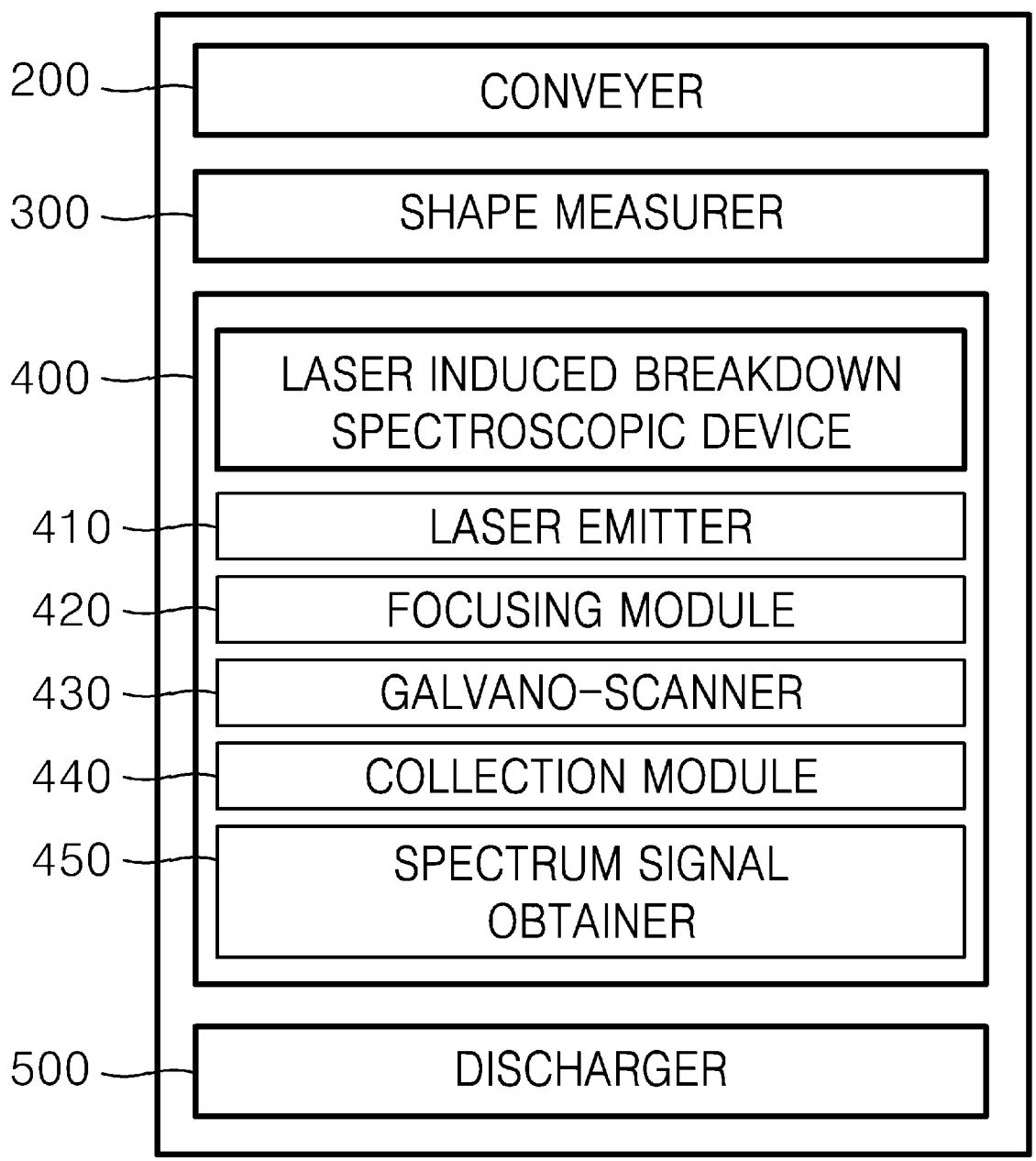
FIG. 1 is a block diagram of an automatic metal sorting system using laser induced breakdown spectroscopy according to an embodiment of the present disclosure.

An automatic metal sorting system using laser induced breakdown spectroscopy according to an embodiment of the present disclosure is disclosed. The system may include: a conveyer configured to move waste metals at a constant speed; a shape measurer configured to measure a position and a shape of at least one waste metal on the conveyer; a laser induced breakdown spectroscopic device configured to determine the kind of the waste metal by emitting a laser to the waste metal and receiving and analyzing a plasma spectrum signal generated by the emitted laser; and a discharger configured to separate and discharge the waste metal in accordance with the determined kind of the waste metal.

An automatic metal sorting method using laser induced breakdown spectroscopy according to an embodiment of the present disclosure is disclosed. The method may include: a shape measurement step of measuring a position and a shape of at least one of waste metals being on a conveyer that is being moved at a constant speed; a laser induced breakdown spectroscopic determination step of determining the kind of the measured waste metal by emitting a laser to the waste metal and by analyzing a plasma spectrum signal generated by the emitted laser; and a step of separating and discharging the waste metal in accordance with the kind of the waste metal determined in the laser induced breakdown spectroscopic determination step.

The present disclosure may be modified in various ways and implemented by various exemplary embodiments, so that specific exemplary embodiments are shown in the drawings and will be described in detail.

Various features of the present disclosure disclosed in claims will be better understood in consideration of drawings and detailed description. An apparatus, a method, a manufacturing method, and various embodiments disclosed in the specification are provided for examples. The disclosed structure and functional features are provided for those skilled in the art to be able to implement various embodiments in detail rather than limiting the scope of the present disclosure. The disclosed terms and sentences are provided to easily explain the features of the present disclosure rather than limiting the scope of the present disclosure.

In describing the present invention, detailed descriptions of well-known technologies will be omitted so as not to obscure the description of the present invention with unnecessary detail Hereafter, an automatic metal sorting system and method using laser induced breakdown spectroscopy according to an embodiment of the present disclosure is described.

Figure 2:
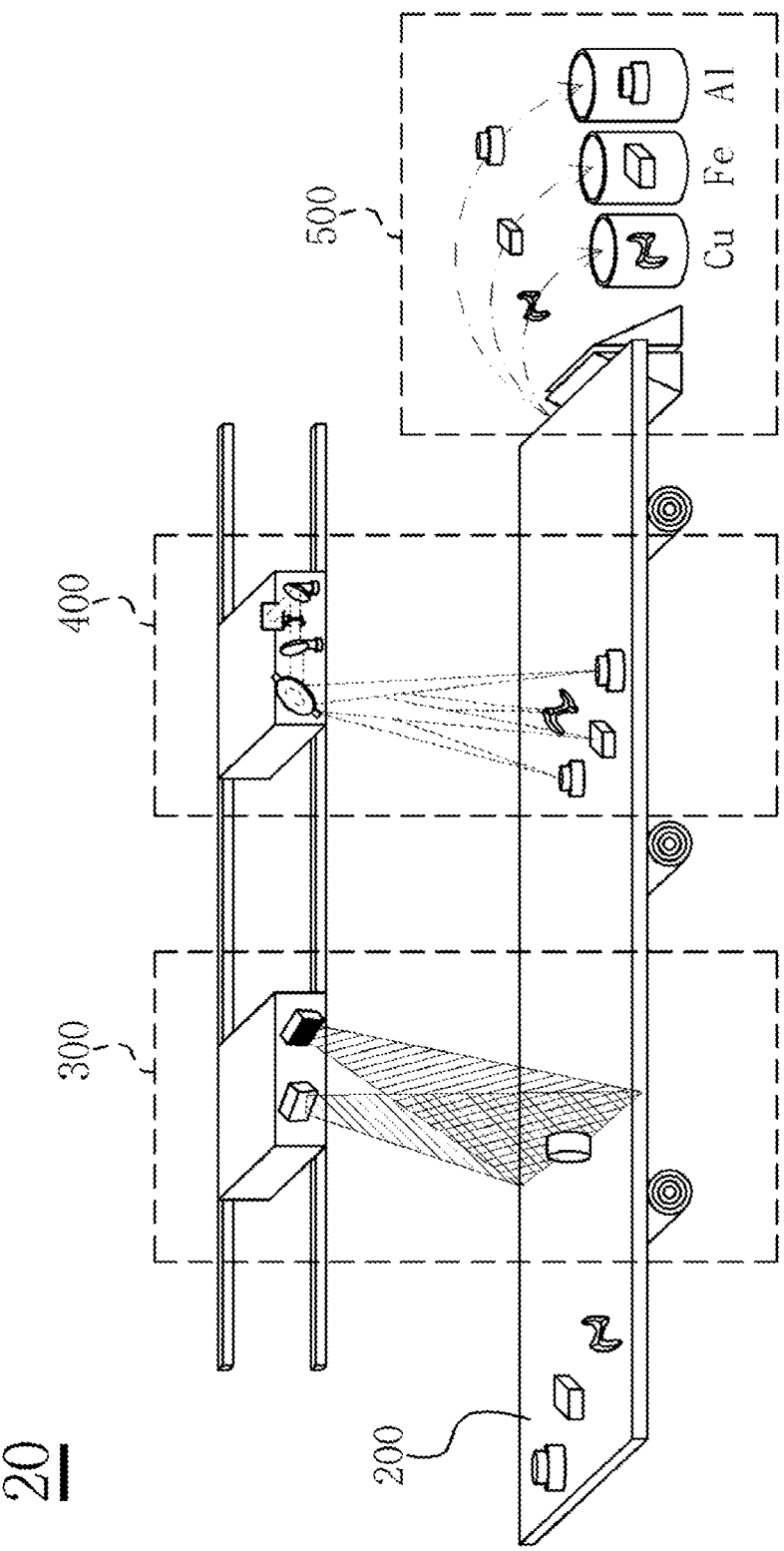
FIG. 2 is a schematic view of the automatic metal sorting system using laser induced breakdown spectroscopy according to an embodiment of the present disclosure.
Figure 3:
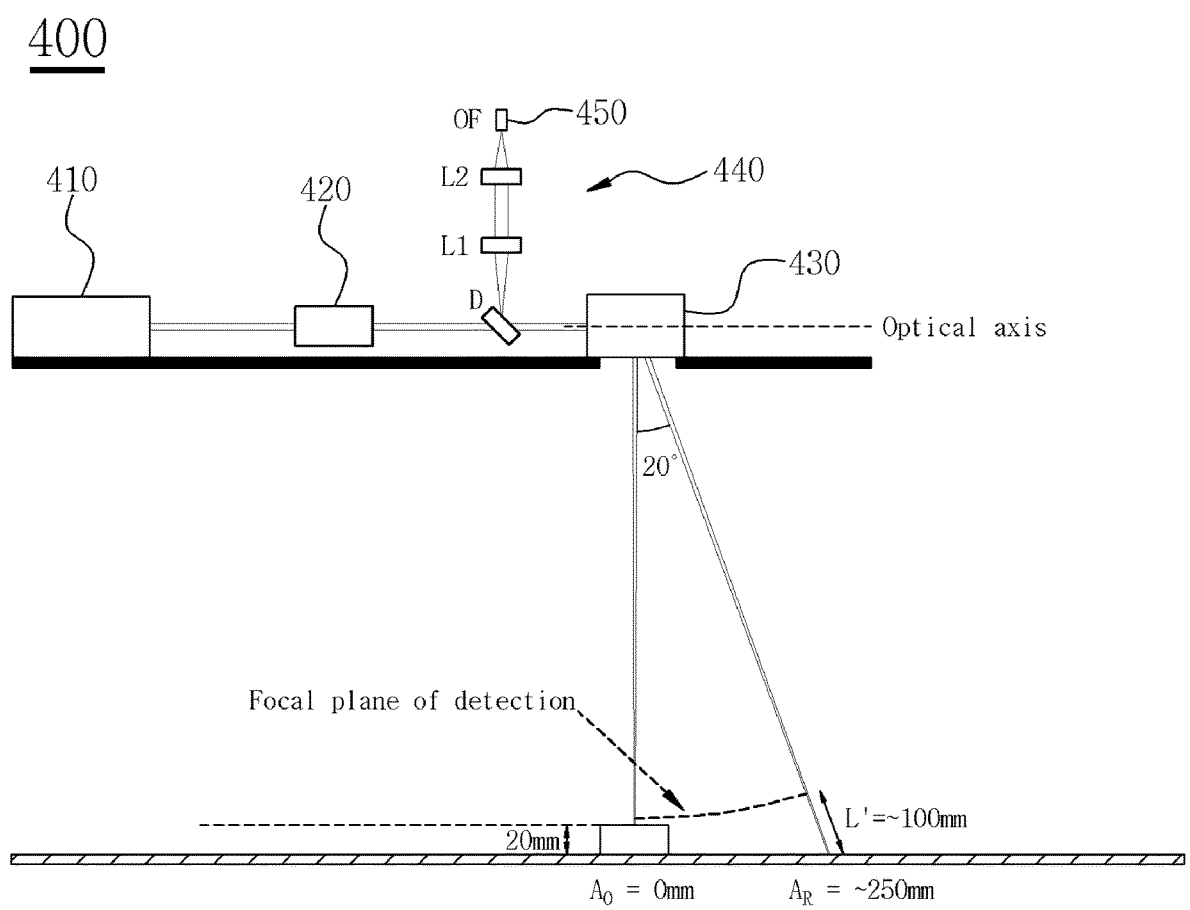
FIG. 3 is a view showing an existing laser induced breakdown spectroscopic device.
Figure 4:
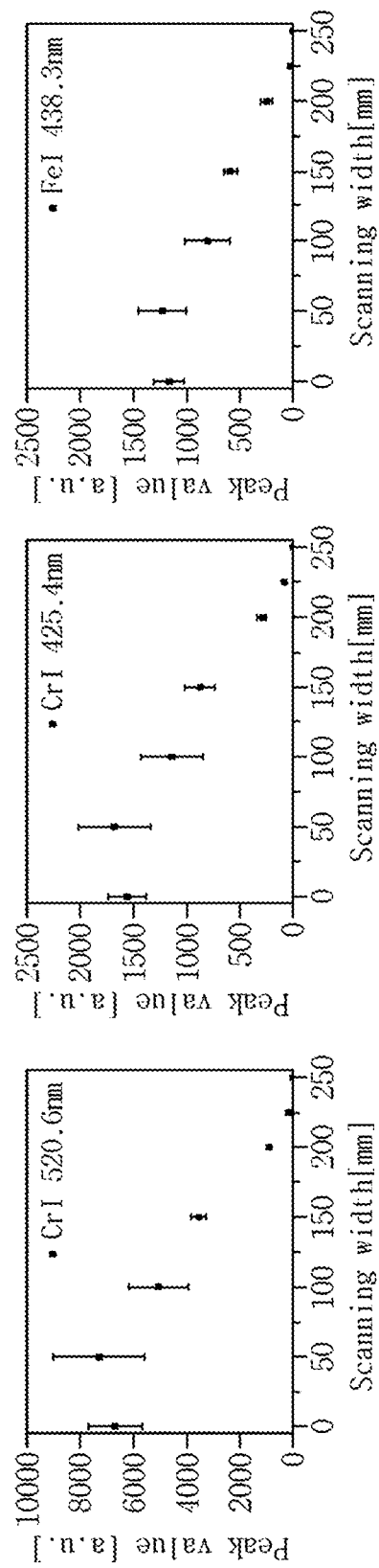
FIG. 4 is a graph showing resultant values measured by an existing laser induced breakdown spectroscopic device.
Figure 5:
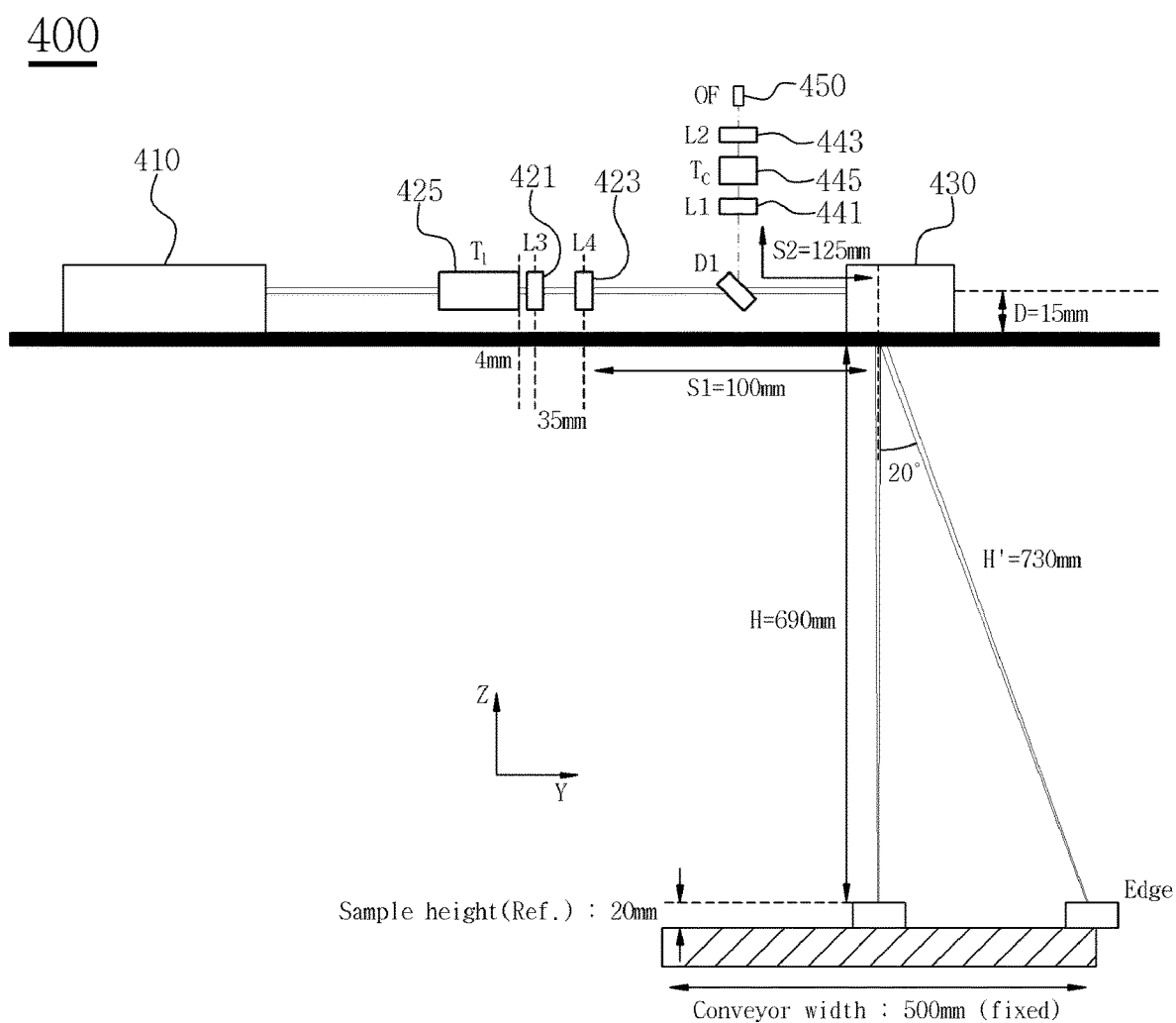
FIG. 5 is a view showing a laser induced breakdown spectroscopic device according to an embodiment of the present disclosure.

FIG. 1 is a block diagram of an automatic metal sorting system using laser induced breakdown spectroscopy according to an embodiment of the present disclosure and FIG. 2 is a schematic view of the automatic metal sorting system using laser induced breakdown spectroscopy according to an embodiment of the present disclosure. FIG. 3 is a view showing an existing laser induced breakdown spectroscopic device and FIG. 4 is a graph showing resultant values measured by an existing laser induced breakdown spectroscopic device. FIG. 5 is a view showing a laser induced breakdown spectroscopic device according to an embodiment of the present disclosure.

Referring to FIGS. 1 to 5, an automatic metal sorting system 10 includes a conveyer 200, a shape measurer 300, a laser induced breakdown spectroscopic device 400, and a discharger 500.

In an embodiment, the conveyer can move waste metals thereon at a constant speed to automatically sort the waste metals. For example, the width of the conveyer may be 500 mm in accordance with the rotation range (−20° to 20°) of a galvano-scanner 440 disposed in the laser induced breakdown spectroscopic device 400. This example is only an example for explaining the present disclosure and the present disclosure is not limited thereto.

In an embodiment, the shape measurer 300 can measure the position and shape of waste metals on the conveyer that is moved at a constant speed. In more detail, the shape measurer 300 can measure the position and shape of waste metals using an optical technology when various resources and metal fragments are moved on the conveyer. The shape measurer 300 is a device that primarily measures the position and shape of waste metals on the conveyer using an optical technology to increase the sorting efficiency before the kinds of the waste metals are determined through the laser induced breakdown spectroscopic device 400.

In an embodiment, the laser induced breakdown spectroscopic device 400 can determine the kinds of waste metals by emitting a laser to the waste metals measured by the shape measurer 300 and then by analyzing generated plasma spectrum signals. The laser induced breakdown spectroscopic device 400 is a device that accurately analyzes the kinds of metals by tracking waste metal spread at random positions of a conveyer belt and analyzing plasma spectrum signals generated by emitting a laser to the waste metals.

In more detail, the laser induced breakdown spectroscopic device 400 may include a laser emitter 410 that emits a laser, a galvano-scanner 430 that emits a laser to waste metals randomly spread on a conveyer by changing the direction of the laser emitted from the laser emitter by adjusting the angle of a mirror disposed in the galvano-scanner, and a spectrum signal obtainer 450 that focuses plasma spectrum signals generated by the emitted laser on an optical fiber connected with a spectroscope.

Further, the laser induced breakdown spectroscopic device 400 may further include a focusing module 420 that adjusts the focal length of the laser emitted from the laser emitter in accordance with changes in position and shape of waste metals.

Further, the laser induced breakdown spectroscopic device 400 may further include a collection module 440 that collects plasma spectrum signals generated by emitting a laser to waste metal through the galvano-scanner.

In an embodiment, the laser emitter 410 is used to analyze the kinds of waste metals of which the position and shape have been measured. For example, the laser that is emitted from the laser emitter may be a laser having output power of 90 mJ, a wavelength of 1064 nm, a pulse repetition frequency of 100 Hz, a beam diameter of 4 mm, and pulse duration of 8 ns. This example is only an example for explaining the present disclosure and the present disclosure is not limited thereto.

In an embodiment, the focusing module 420 may include a plurality of optical lenses and variable lenses. In more detail, the focusing lens 420 may be a module that adjusts the focal length of a laser with a first variable lens 425 inserted between the laser emitter 410 and at least one or more optical lenses. The focusing module 420 may include two optical lenses and a first variable lens inserted in the fronts of the two optical lenses.

Further, the focusing module 420 is positioned between the laser emitter 410 and a dichroic mirror D and is composed of a double-sided concave lens 421 and a double lens 423 sequentially from the laser emitter 410, and the first variable lens 425 may be positioned between the laser emitter 410 and the double-sided concave lens 421. Further, the inserted first variable lens 425 is a liquid-state lens, and when a current is applied to the first variable lens 425, the curvature may be changed.

Accordingly, the focusing module 420 can adjust the focal length of a laser by changing a lens curvature by applying a current to the inserted first variable lens 425. Further, it is possible to adjust the focal length of a laser by changing the distance between the double-sided concave lens 421 and the double lens 423. The double lens may be used to correct distortion that may be generated when a laser is focused.

For example, the double-sided concave lens 421 may have a focal length of 75 mm and 7.5 J/m², the double lens 423 may have a focal length of 100 mm and 10 J/m², and the first variable lens 425 may have 100 Hz, 2.6 J/m², and −2 +2 (dpt). Further, the distance between the double-sided concave lens 421 and the double lens 423 may be 35 mm and the distance between the first variable lens 425 and the double-sided concave lens 421 may be 3 mm. This example is only an example for explaining the present disclosure and the present disclosure is not limited thereto.

Further, the dichroic mirror D, which is a reflecting mirror composed of thin layers of substances having different refractive indexes, has a property of reflecting light of some colors and transmitting light of all the other colors. The dichroic mirror D has a characteristic that a loss due to absorption is very small in comparison to a color filter and the wavelength range of light that is selectively reflected can be increased/decreased, depending on the thickness or structure of the material. For example, the dichroic mirror D may have a reflection range of 380 to 850 nm and 6.5 J/m2. This example is only an example for explaining the present disclosure and the present disclosure is not limited thereto.

In an embodiment, the galvano-scanner 430 is equipment that can perform multipoint laser scanning using one laser by changing the emission direction of a laser by rotating a mirror at a predetermined speed and at a predetermined angle when it is used in cooperation with a laser. The galvano-scanner 430 can cope with real-time changes by adjusting the angle of a mirror in real time to fit to an adjusted focal length when a focal length is changed by the focusing module 420.

For example, the galvano-scanner 430 may have −20° or +20°, a reflection range of 380 to 2000 nm, and 3 J/m². This example is only an example for explaining the present disclosure and the present disclosure is not limited thereto.

In an embodiment, the collection module 440 can collect plasma spectrum signals that are generated when a laser is emitted to waste metals through the galvano-scanner 430. The collection module 440 may include two optical lenses and a second variable lens 445 inserted between the two optical lenses. The collection module 440 may be a module that adjusts plasma spectrum signals with the second variable lens 445 inserted between two optical lenses and collects the adjusted plasma spectrum signals.

In more detail, the collection module 440 may be a module that has the second variable lens 445 inserted between two optical lenses, that adjusts a beam that has passed through the second variable lens 445 to become parallel light by changing the curvature of the second variable lens 445, and that collects adjusted plasma spectrum signals. Further, the collection module 440 may be a module that is positioned over the dichroic mirror D positioned between the focusing module 420 and the galvano-scanner 430, is composed of a double lens 441 and a double lens 443, from the bottom, and has the second variable lens 445 between these lenses.

Further, the inserted second variable lens 445 is a liquid-state lens, and when a current is applied to the second variable lens 445, the curvature may be changed. Accordingly, the collection module 440 can serve to adjust the laser that has passed through the variable lens to become parallel light by changing a lens curvature by applying a current to the inserted second variable lens 445.

For example, the focal length of the double lens 441 may be 150 mm, the focal length of the upper double lens 443 may be 50 mm, and the second variable lens 445 may have 100 Hz, a transmission range of 400 to 700 nm, and −1.5 to +1.5 (dpt). Further, the distance between a single lens 441 or the double lens 441 and the second variable lens 445 may be 60 mm, and the distance between the optical fiber 450 and the upper double lens 443 may be 40 mm to 50 mm. This example is only an example for explaining the present disclosure and the present disclosure is not limited thereto.

In an embodiment, the spectrum signal obtainer 450 is positioned over the collection module 440 and can serve to focus plasma spectrum signals collected by the collection module 440 on an optical fiber connected with a spectroscope. For example, the optical fiber may be an optical fiber of which the core has 200 μm and 0.22 NA. This example is only an example for explaining the present disclosure and the present disclosure is not limited thereto.

Figure 6:
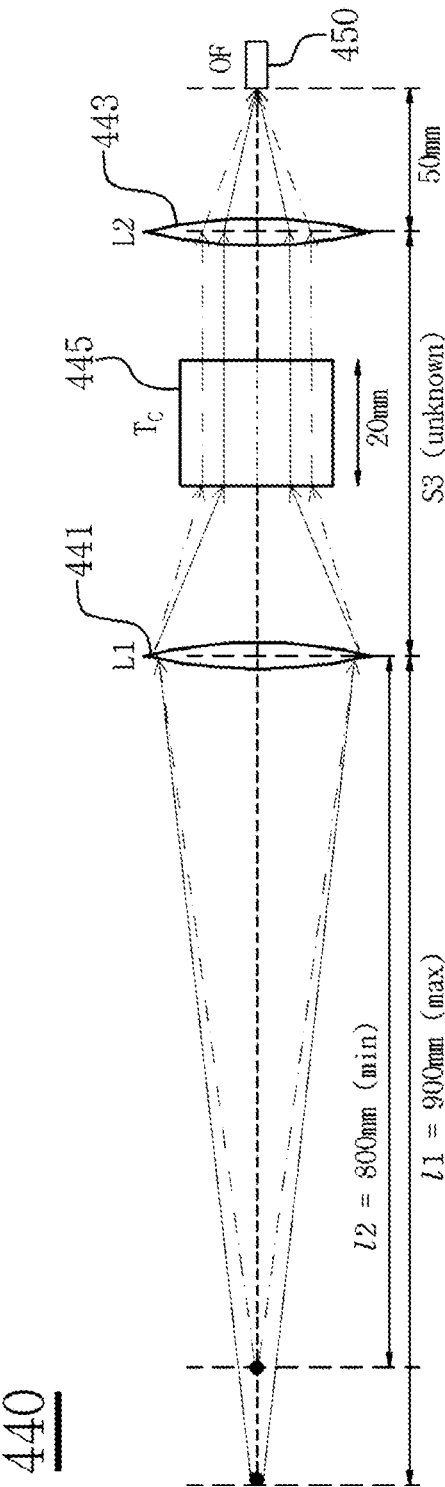
FIG. 6 is a view showing a collection module of the laser induced breakdown spectroscopic device according to an embodiment of the present disclosure.
Figure 6:
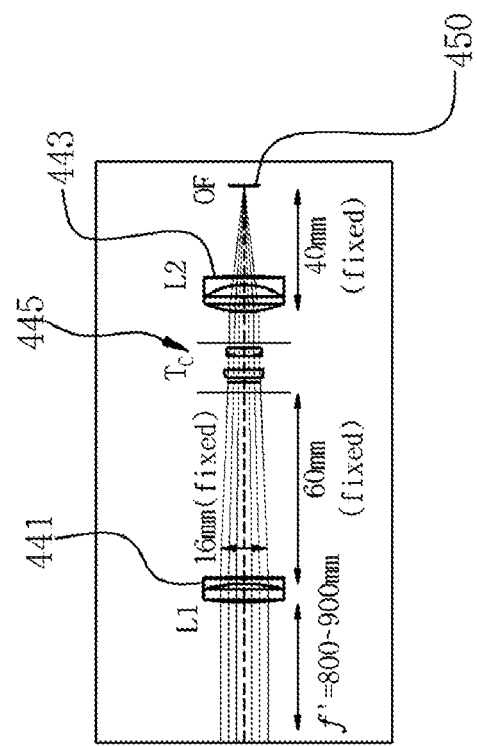

Further, FIG. 6 is a view showing a collection module of the laser induced breakdown spectroscopic device according to an embodiment of the present disclosure. Referring to FIG. 6, the collection module 440 is designed using a variable lens through Zemax simulation. A collection route after an optical lens L1 (441) is changed by the laws of refraction in accordance with a generation distance of plasma from an optical axis, which causes a change of a phase when plasma is focused on the optical fiber 450. The system of the present disclosure is a system that additionally has the second variable lens 445 between two optical lenses L1 and L2 and can adjust in real time the curvature of the second variable lens 445 such that a beam coming out of the second variable lens 445 can always become parallel light in order that plasma generated at various positions in accordance with the positions of waste metal can be maximally focused on the optical fiber 450 connected to a spectroscope. The parallel light traveling into the double lens 443 is focused always in the same state, so a constant signal can be obtained at a spectroscope in this case. It can be seen that plasma spectrum signals are finally focused on the optical fiber 450 under the same condition by changing the curvature of the second variable lens in real time even if the generation position of plasma changes as the result of simulation.

Laser Induced Breakdown Spectroscopy (LIBS) is a chemical analysis technique that performs analysis using short laser pulses to make micro-plasma on an analysis sample.

The present disclosure performs analysis using laser spectroscopic analysis, thereby being able to considerably increase the economic value of waste metals by sorting non-ferrous metals having similar colors, which were impossible to sort in the related art, by accurately measuring the chemical compositions of the non-ferrous metals.

Further, the present disclosure corrects the focal length of a laser and corrects errors of plasma spectrum signals by inserting a variable lens when using laser induced breakdown spectroscopic analysis, thereby being able to reduce a measurement error due to a distance difference according to the positions of waste metals randomly spread.

In an embodiment, the discharger 500 is positioned at the end of the conveyer and can separate and discharge waste metals using air nozzles in accordance with the kinds of the waste metals. Waste metals can be automatically separated and discharged in accordance with the weight of the waste metals discharged by air sprayed from the air nozzles.

Figure 7:
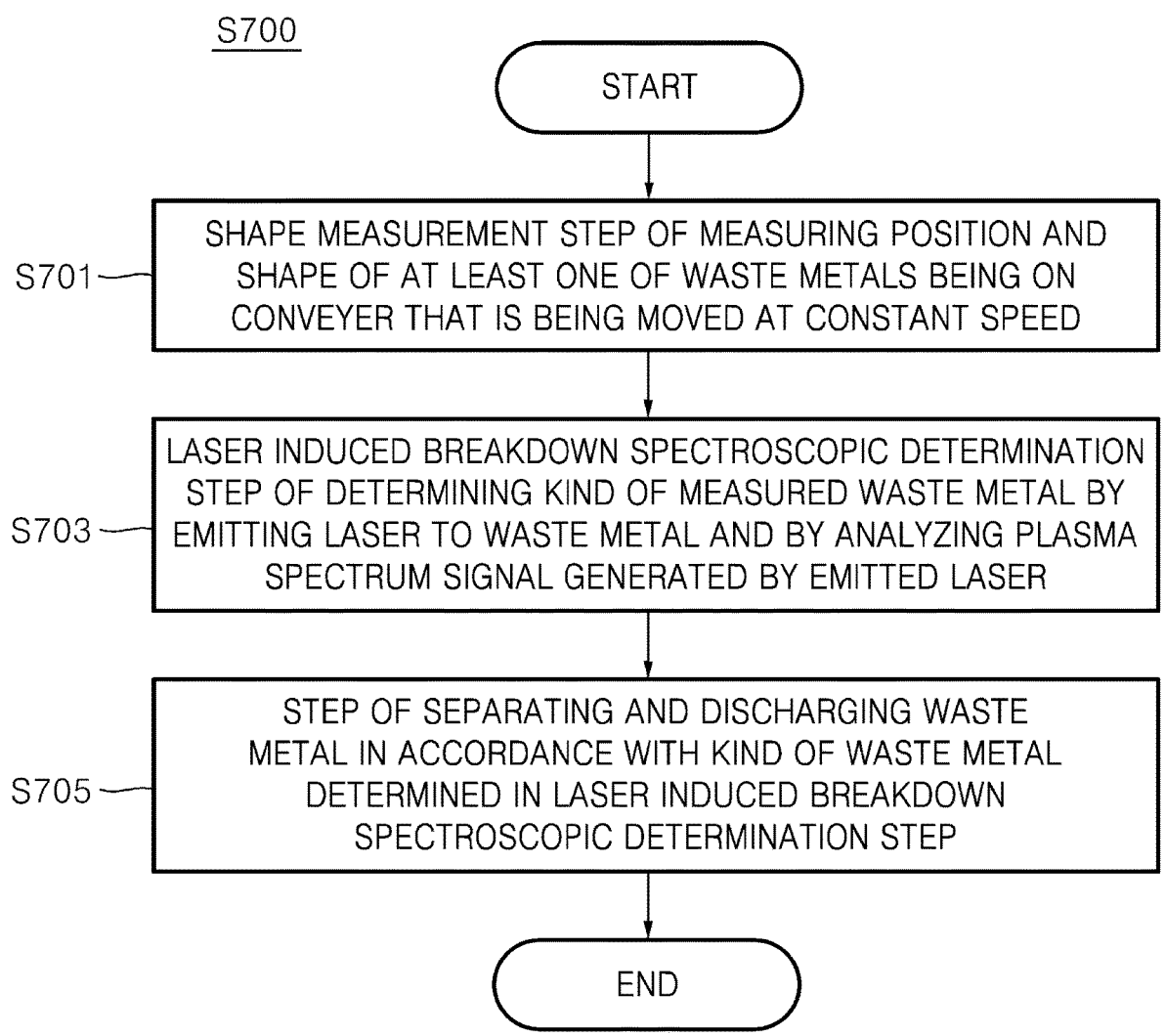
FIG. 7 is a flowchart of an automatic metal sorting method using laser induced breakdown spectroscopy according to an embodiment of the present disclosure.

FIG. 7 is a flowchart of an automatic metal sorting method using laser induced breakdown spectroscopy according to an embodiment of the present disclosure.

Referring to FIG. 7, the method may include: a shape measurement step of measuring the position and the shape of at least one of waste metals being on a conveyer that is being moved at a constant speed (S701); a laser induced breakdown spectroscopic determination step of determining the kind of the measured waste metal by emitting a laser to the waste metal and by analyzing a plasma spectrum signal generated by the emitted laser (S703); and a step of separating and discharging the waste metal in accordance with the kind of the waste metal determined in the laser induced breakdown spectroscopic determination step (S705).

In an embodiment, the shape measurement step S701 is a step of measuring the shape and position of at least one of waste metals being on a conveyer that is being moved at a constant speed.

In more detail, the shape measurement step S701 can measure the position and shape of waste metals using an optical technology when various resources and metal fragments are moved on the conveyer. Further, the shape measurement step S701 is a step of primarily measuring the position and shape of waste metals on the conveyer using an optical technology to increase the sorting efficiency before the kinds of the waste metals are determined through the laser induced breakdown spectroscopic determination step S703.

In an embodiment, the laser induced breakdown spectroscopic determination step S703 is a step of determining the kind of a measured waste metal by emitting a laser to the waste metal and analyzing a plasma spectrum signal generated by the emitted laser. Further, the laser induced breakdown spectroscopic determination step S703 may be a step of accurately analyzing the kinds of metals by tracking waste metals spread at random positions on a conveyer belt and analyzing spectrum signals of plasma generated by emitting a laser.

In more detail, the laser induced breakdown spectroscopic determination step S703 may include: a laser emission step of emitting a laser; a focusing step of adjusting the focal length of the laser emitted in the laser emission step in accordance with changes in position and shape of waste metals; a galvano-scanner step of emitting a laser to the waste metals randomly spread on a conveyer by changing the direction of the laser having the adjusted focal length by adjusting a mirror disposed in a galvano-scanner; a collection step of collecting plasma spectrum signals generated by emitting a laser to the waste metals through the galvano-scanner step; and a spectrum signal obtainment step of focusing the collected plasma spectrum signals on an optical fiber connected with a spectroscope.

In an embodiment, the focusing step may be a step of adjusting the focal length of a laser according to position changes of waste metals that are separated at random positions and moving on a conveyer. Further, the focusing step is a step that is performed between the laser emission step and the galvano-scanner step and may be a step of adjusting the focal length of a laser using at least one or more optical lenses.

In more detail, the focusing step may be a step of adjusting the focal length of a laser using two optical lenses and a first variable lens inserted in the fronts of the two optical lenses. The inserted first variable lens 425 is a liquid-state lens, and when a current is applied to the first variable lens 425, the curvature may be changed. Further, the focusing step may be a step of adjusting the focal length of a laser by changing a lens curvature by applying a current to the inserted first variable lens 425.

In an embodiment, the collection step may be a step of collecting plasma spectrum signals generated by emitting a laser to waste metals.

In more detail, the collection step may be a step that adjusts plasma spectrum signals with the second variable lens 445 inserted between two optical lenses and collects the adjusted plasma spectrum signals. Further, the collection step may be a step that has the second variable lens 445 inserted between two optical lenses, that adjusts a beam that has passed through the second variable lens 445 to become parallel light by changing the curvature of the second variable lens 445, and that collects adjusted plasma spectrum signals. The inserted second variable lens 445 is a liquid-state lens, and when a current is applied to the second variable lens 445, the curvature may be changed. Further, the collection step may be a step of adjusting the beam, which has passed through the second variable lens 445, to become parallel light by changing a lens curvature by applying a current to the inserted second variable lens 445.

In an embodiment, the separating and discharging step S705 may be a step of separating and discharging waste metals in accordance with the kinds of the waste metals determined in the laser induced breakdown spectroscopic determination step S703. In more detail, the separating and discharging step S705 is positioned at the end of the conveyer. In order to separate and discharge waste metals of which the kinds have been determined, the separating and discharging step S705 can separate and discharge waste metals in order of heavy metals using air coming out of a discharger equipped with air nozzles.

The above description is only exemplary description of the spirit of the present disclosure and the present disclosure may be changed and modified by those skilled in the art in various ways without departing from the fundamental characteristics of the present disclosure.

Accordingly, the embodiments described herein are provided merely not to limit, but to explain the spirit of the present disclosure, and the spirit of the present disclosure is not limited by the embodiments.

The protection range of the present disclosure should be construed on the basis of claims and all spirits that are considered as being same or equivalent to the protection range should be construed as being included in the right range of the present disclosure.

What is claimed is:

1. An automatic metal sorting system using laser induced breakdown spectroscopy, the automatic metal sorting system comprising:
   a conveyer configured to move waste metals at a constant speed;
   a shape measurer configured to measure a position and a shape of at least one waste metal on the conveyer;
   a laser induced breakdown spectroscopic device configured to determine the kind of the waste metal by emitting a laser to the waste metal and receiving and analyzing a plasma spectrum signal generated by the emitted laser; and
   a discharger configured to separate and discharge the waste metal in accordance with the determined kind of the waste metal,
   wherein the laser induced breakdown spectroscopic device includes:
   a laser emitter configured to emit the laser;
   a focusing module configured to receive the laser from the laser emitter, and adjust a focal length of the laser in accordance with a change in positions and shapes of the waste metals;
   a dichroic mirror configured to receive the laser having the adjusted focal length from the focusing module, and transmit the received laser; and a galvano-scanner configured to receive the laser from the dichroic mirror, and direct the laser to the waste metals located on the conveyer by changing a direction of the laser emitted from the laser emitter by adjusting an angle of a mirror disposed in the galvano-scanner, and wherein the focusing module is positioned between the dichroic mirror and the laser emitter, and the dichroic mirror is positioned between the focusing module and the galvano-scanner.

2. The automatic metal sorting system of claim 1, wherein the laser induced breakdown spectroscopic device further includes:

a spectrum signal obtainer configured to focus plasma signals generated by the laser on an optical fiber connected with a spectroscope, and wherein the spectrum signal obtainer is positioned above the dichroic mirror.

3. The automatic metal sorting system of claim 2, wherein the laser induced breakdown spectroscopic device further includes a collection module configured to collect plasma spectrum signals generated by the laser, and wherein the collection module is positioned above the dichroic mirror and below the spectrum signal obtainer.

4. The automatic metal sorting system of claim 1, wherein the focusing module includes:

two optical lenses; and a first variable lens inserted in the fronts of the two optical lenses.

5. The automatic metal sorting system of claim 3, wherein the collection module includes:

two optical lenses; and a second variable lens inserted between the two optical lenses.

6. The automatic metal sorting system of claim 3, wherein the collection module includes:

two optical lenses; and a second variable lens inserted between the two optical lenses, and adjusts a beam, which has passed through the second variable lens to become parallel light, by changing a curvature of the second variable lens, and collects adjusted plasma spectrum signals.

7. The automatic metal sorting system of claim 4, wherein the first variable lens is a liquid-state lens of which a curvature is changed when a current is applied to the first variable lens.

8. The automatic metal sorting system of claim 5, wherein the second variable lens is a liquid-state lens of which a curvature is changed when a current is applied to the second variable lens.

9. The automatic metal sorting system of claim 1, wherein the discharger is positioned at an end of the conveyer and separates and discharges the waste metals in accordance with the determined kinds of the waste metals using air nozzles.

10. An automatic metal sorting method using laser induced breakdown spectroscopy, the automatic metal sorting method comprising:

measuring a position and a shape of at least one of waste metals being on a conveyer that is being moved at a constant speed;

determining the kind of the measured waste metal by emitting a laser to the waste metal and by analyzing a plasma spectrum signal generated by the emitted laser; and separating and discharging the waste metal in accordance with the determined kind of the waste metal, wherein the determining comprises:

emitting the laser by a laser emitter;

receiving, by a focusing module, the laser from the laser emitter;

adjusting, by the focusing module, a focal length of the laser in accordance with a change in positions and shapes of the waste metals;

receiving, by a dichroic mirror, the laser having the adjusted focal length from the focusing module;

transmit, by the dichroic mirror, the received laser;

receiving, by a galvano-scanner, the laser from the dichroic mirror; and directing, by the galvano-scanner, the laser to the waste metals located on the conveyer by changing a direction of the laser emitted from the laser emitter by adjusting an angle of a mirror disposed in the galvano-scanner, and wherein the focusing module is positioned between the dichroic mirror and the laser emitter, and the dichroic mirror is positioned between the focusing module and the galvano-scanner.

11. The automatic metal sorting method of claim 10, wherein the determining further comprises:

collecting, by a collection module, plasma spectrum signals generated by the laser; and focusing, by a spectrum signal obtainer, the collected plasma spectrum signals on an optical fiber connected with a spectroscope, wherein the spectrum signal obtainer is positioned above the dichroic mirror, and the collection module is positioned above the dichroic mirror and below the spectrum signal obtainer.

12. The automatic metal sorting method of claim 11, wherein the adjusting comprises:

adjusting the focal length of the laser by using two optical lenses and a first variable lens inserted in the fronts of the two optical lenses.

13. The automatic metal sorting method of claim 11, wherein the collecting comprises:

adjusting a beam, which has passed through a second variable lens, to become parallel light by changing a curvature of the second variable lens and of collecting adjusted plasma signals by using two optical lenses and the second variable lens inserted between the two optical lenses.

14. The automatic metal sorting method of claim 12, wherein the first variable lens is a liquid-state lens of which a curvature is changed when a current is applied to the first variable lens.

15. The automatic metal sorting method of claim 13, wherein the second variable lens is a liquid-state lens of which a curvature is changed when a current is applied to the second variable lens.

16. The automatic metal sorting method of claim 10, wherein the separating and discharge comprising:

separating and discharge by a discharger, which is positioned at an end of the conveyer and separates and discharges the waste metals in accordance with the determined kinds of the waste metals using air nozzles.

* * * * *